March 28, 1967
A. ORIOLI
3,310,855
APPARATUS FOR OPERATING ON CONTINUOUSLY MOVING MATERIAL WITH
MEANS TO RELATE THE SPEED OF THE TOOL CARRIAGE
TO THAT OF THE MATERIAL
Filed Feb. 21, 1966
3 Sheets-Sheet 1
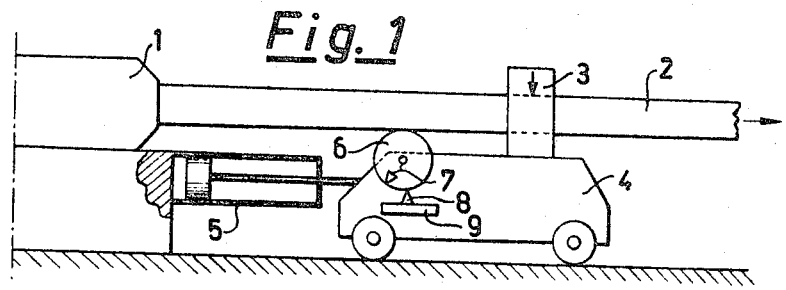
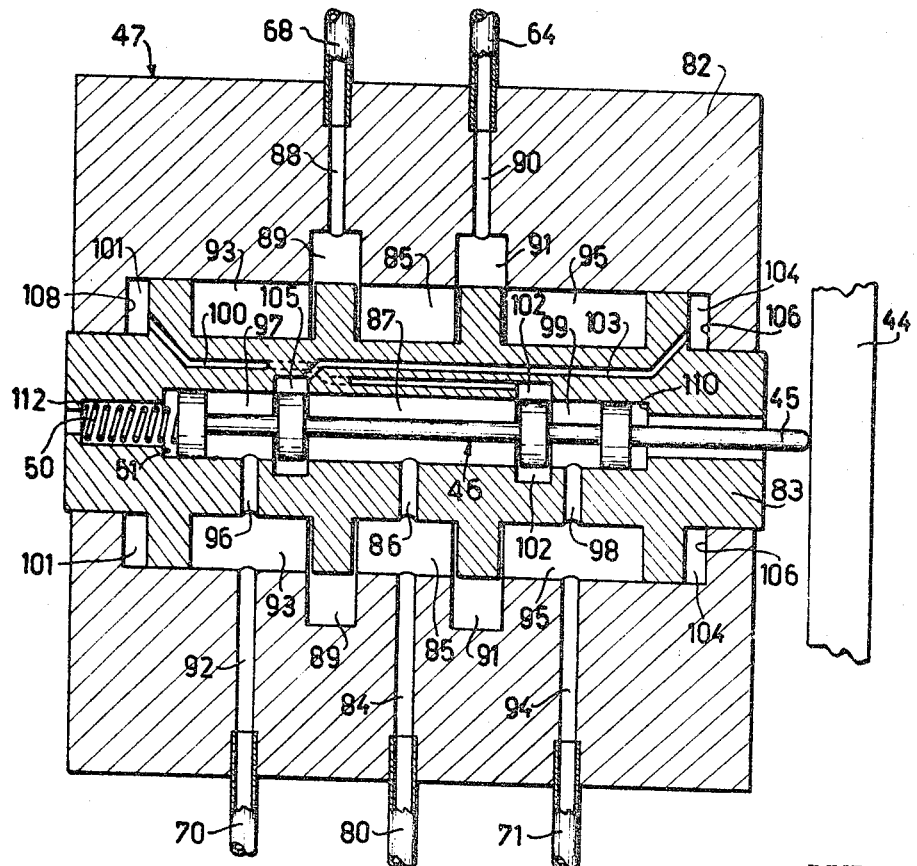
INVENTOR
Alessandro Orioli
BY
Michael S. Striker
ATTORNEY

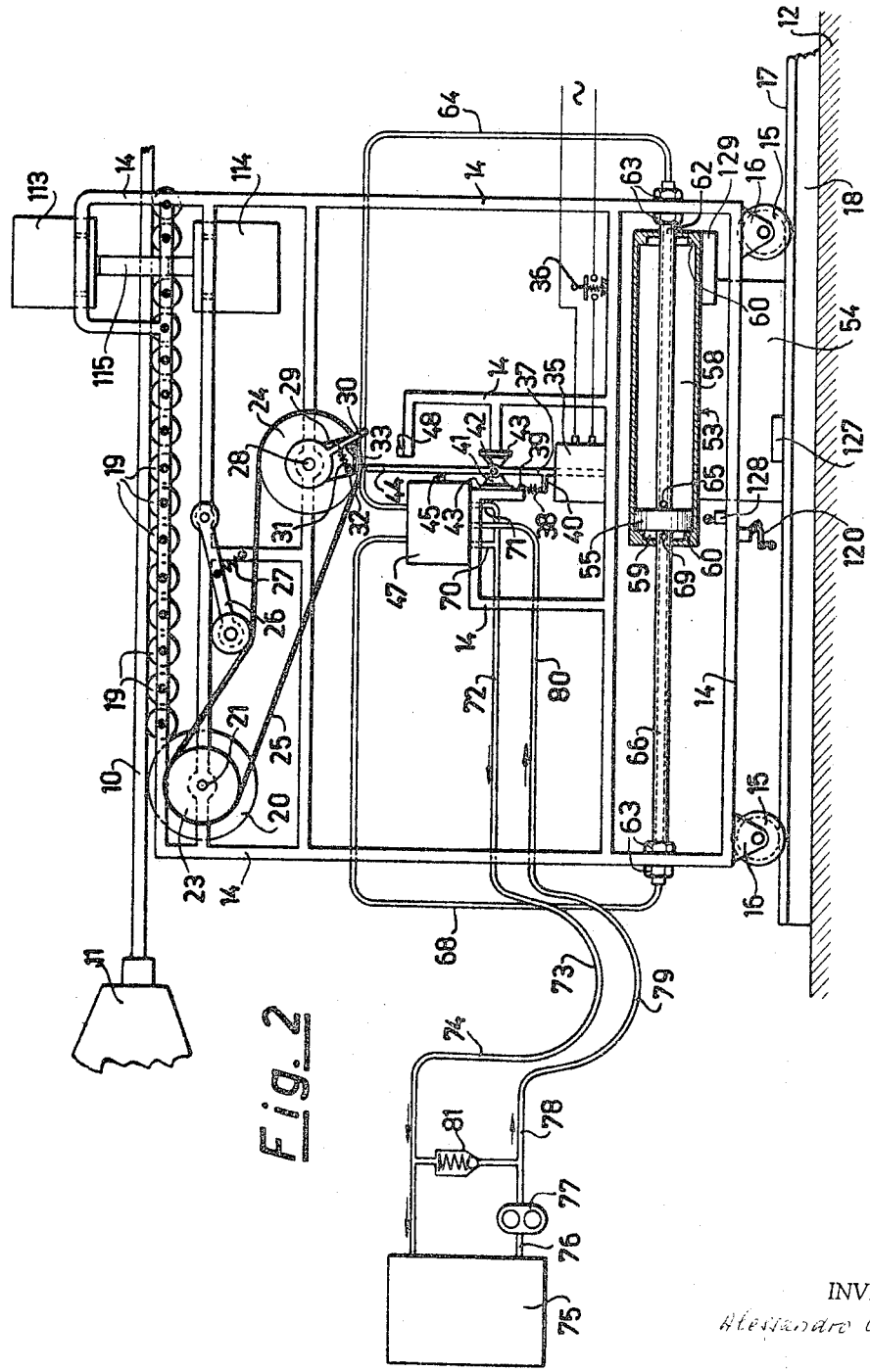

March 28, 1967 A. ORIOLI 3,310,855
APPARATUS FOR OPERATING ON CONTINUOUSLY MOVING MATERIAL WITH
MEANS TO RELATE THE SPEED OF THE TOOL CARRIAGE
TO THAT OF THE MATERIAL
Filed Feb. 21, 1966 3 Sheets-Sheet 3
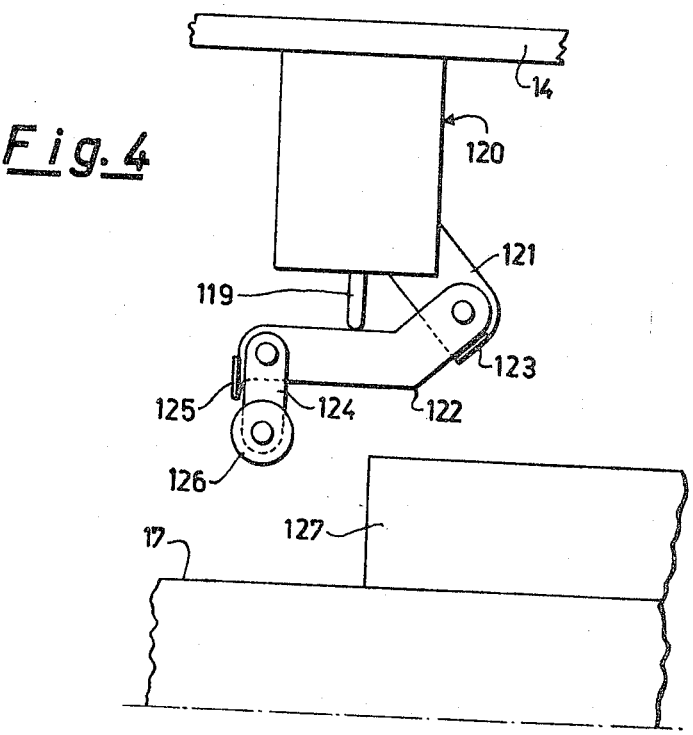
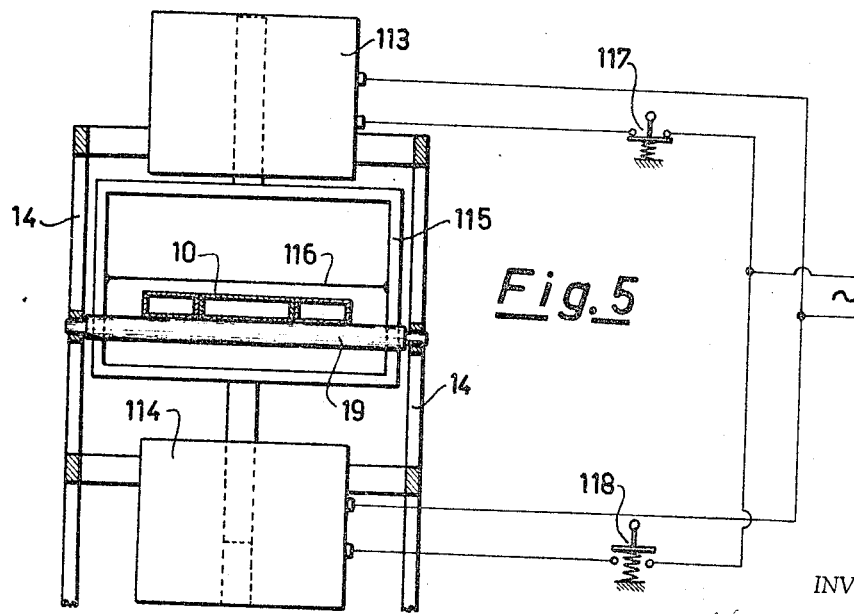
INVENTOR
Alessandro Orioli
BY
Michael J. Striker
ATTORNEY United States Patent Office 3,310,855
Patented Mar. 28, 1967

3,310,855
APPARATUS FOR OPERATING ON CONTINUOUS-
LY MOVING MATERIAL WITH MEANS TO RE-
LATE THE SPEED OF THE TOOL CARRIAGE TO
THAT OF THE MATERIAL
Alessandro Orioli, Via di Villa Tipano 91, Cesena, Italy
Filed Feb. 21, 1966, Ser. No. 529,125
9 Claims. (Cl. 25—107)

The present invention relates to an apparatus fit to perform a series of operations in succession, equal or different from one another, in preselected places of a continuously moving material.

A first problem which must be overcome in order for the mechanism or mechanisms which must perform the said operations, such as, for example, cuts, holes, punchings, molding operations, bendings etc. to operate on the continuously moving material, at a speed which might be not constant, under conditions as much as possible approaching the ideal ones in which the same operations could be performed on a stationary material, is to obtain that at least in the time interval in which said operations are being performed, the mechanism or mechanisms move, with respect to the material, at a relative speed the component of which in the direction of the movement of the material itself be equal to zero or practically equal to zero.

This problem has been solved in the known art in different ways, among which the one in which use is made of a carriage which can move alternatively back and forth in a parallel direction to the one of movement of the material is particularly remarkable, the carriage carrying the above mechanism or mechanisms and, sometimes, the relevant actuating means.

In the known art, the carriage can be moved by a motor with a concurrent direction to the one of the continuously moving material and with a speed approximately equal to the one of the material itself and, by overcoming its resistance to undergo speed variations, the speed of the carriage is caused to be equal or practically equal to the one of the moving material, at the moment when said operations have to be performed, by the action performed by the material directly on the carriage, through friction or thrust.

Now it must be stressed here that a serious disadvantage of the known art, which has been briefly outlined above, is that it is obviously not possible to take advantage of the action produced by the material directly on the carriage, by friction or thrust, in order to overcome its resistance and modify its speed so that it can become equal to the one of the material, when this material is not able to perform substantial traction or compression actions without undergoing, in so doing, at least inadmissible deformations.

It is therefore an object of the present invention to solve the above first problem, by using as in the known art, a carriage carrying said mechanism or mechanisms and which is able to move in a direction parallel to the one of the motion of the material, but in such a way that only a very small force is transmitted from the material to the carriage in order to bring down to zero or practically zero the speed of the carriage relative to it, said force having only to drive a mechanism which operates on the actuating devices of a motor which in turn checks the speed of the carriage relative to the one of the material.

A second problem which must be solved is to compel the carriage, once it has a zero speed with respect to the continuously moving material, to be in such a position, with respect to the material itself, that the mechanism or mechanisms can perform the desired operations exactly in the preselected places of the material.

Such problem, which can be of a very high practical importance, comes first of all from the fact that from the moment when the starting signal is transmitted to the motor of the carriage and the moment when the motor itself gives an accelerating motion to the carriage, and from the moment when the carriage acceleration starts and the moment when the carriage has a zero speed relative to the continuously moving material an interval of time elapses which has no constant value, due to several factors, variable and different from one time to the other, such as, for example, temperature and humidity, friction, speed of movement, inertia etc., which can also change between the performance of one operation and the performance of the next one.

Said not constant, variable interval of time elapsing from the moment when the starting signal is given to the carriage motor to the moment when a zero relative velocity is obtained between the carriage and the material, causes, as a consequence, between two successive operations the material to undergo from one time to the other variable and uncontrolled movements with respect to the carriage, which means that an error is made in the position of the moving carriage with respect to the position where the above operations must be performed.

Therefore, another object of the present invention is to control the above error, by controlling as a consequence of the error itself, the position of the carriage through the motor in such a way that the error be eliminated or, at least, brought down to narrow and acceptable limits.

Now, in order to control the above error in the short available intervals of time it is necessary to rely on a motor of high power and to be able to proportion the above power with great accuracy, which can be obtained by use of a fluid actuated motor.

According to the present invention an apparatus has therefore been provided comprising a carriage which can move parallel to the material, there being mounted on said carriage at least a mechanism intended to perform a succession of operations in preselected places of the continuously moving material, a fluid actuated motor for driving the carriage control means for the motor, and a first device which at least during the interval of time in which the mechanism is actuated in order to perform the above operations, continuously measures the deviation of a point of the carriage from each of said preselected places on the material and continuously performs an action on the control means of the motor, the intensity of said action depending on the measure of said deviation, and which causes the motor to move the carriage to reduce the deviation, so as to keep it substantially equal to zero during the interval of time in which the mechanism is actuated to perform said operations.

More particularly said device is carried by the carriage, and more particularly again, it is sensitive to the deviation of a point of the carriage from a point of a moving element carried by the carriage itself and actuated by the continuously moving material.

In order to illustrate further the invention, and the advantages deriving from it, the detailed description of an embodiment of the invention itself will be hereafter given, as an example and not a limitation thereof, in connection with the appended drawings, in which:

FIG. 1 shows a side elevation of a schematic view of a particular embodiment of an apparatus according to the invention;

FIG. 2 shows, also a side elevation of an apparatus intended to cut a continuous clay stream;

FIG. 3 is a longitudinal section of a valve with four pilot edges, fitted with a servomotor piston, belonging to the apparatus of FIG. 1;

FIG. 4 shows the detail of the control device of the cutting machine belonging to the apparatus of FIG. 1 and FIG. 5 is a schematic front view of the cutting machine showing the electric diagram of the control circuit for the said cutting machine.

Referring first to FIG. 1, one sees that in said figure an extruder 1 is shown out of which a stream or strand of plastic material 2, for example clay, is continuously extruded with a constant or not constant speed. A cutting machine 3, capable of cutting stream 2 into successive pieces, is mounted on carriage 4 which can move parallel to the stream itself with alternate movement, the carriage being moved by hydraulic cylinder 5 in concurrent direction or opposed direction to the one of the movement with which stream 2 moves. Carriage 4 supports the axis of a revolving roll 6 which touches streams 2, in such a way as to be rotated by the strand itself by friction and without relative sliding. On roll 6 an element 7 is provided, while an element 8 is mounted on the carriage, which carries also a device 9 responsive to the deviation between points 7 and 8, in such a way that it controls, in a way which has not been illustrated in FIG. 1 for the sake of simplicity, the feed of fluid to the hydraulic cylinder in order to eliminate or practically eliminate the deviation between elements 7 and 8. The carriage is supposed to be completely shifted to the left side of the figure, i.e. near to extruder 1, and at a certain moment element 7, which is carried by roll 6 rotated by the clay stream moving on top of the roll itself, is supposed to overtake element 8. Under these circumstances fluid is sent to the hydraulic cylinder so as to move forward the carriage concurrently with the stream: the fluid feed to the fluid cylinder takes place through a valve, not shown in the drawing, the opening of which is controlled by device 9 in such a way that the position of the carriage with respect to the material is such that element 7 is practically opposed to element 8 and that, as a consequence, the carriage speed is practically equal to the speed of the material.

In other words, the action of device 9 on the hydraulic cylinder is such that it aims to accelerate or slow down the speed of the carriage in such a way as to keep element 7 practically opposed to element 8. During this movement of the carriage at the same speed of the stream at a certain moment the cutting machine 3 cuts stream 2 with a cut perfectly perpendicular to the stream itself, if the cutting machine is vertical, since there is no longitudinal movement between the stream and the cutting machine. When the carriage reaches its limit stop on the right of FIG. 1, the movement imparted to it by the hydraulic cylinder is reversed, through the action of devices not shown in the drawing, while the stream keeps on moving towards the right side. During the return run of the carriage roll 6 is quickly rotated because of friction with the stream; diameter of roll 6 is such, however, that it is thus rotated by less than 360°. When the carriage stops at its left side limit stop, with reference to FIG. 1, stream 2 keeps on rotating roll 6, at a lower speed than the speed at which the same roll rotated during the translation movement of the carriage towards the left side, until element 7 overtakes again element 8, after which moment the already described operation is repeated. One can immediately notice that the distance between two successive cuts of the stream is exactly equal to the length of the circumstance of roll 6 rotating by the moving stream: more generally, the distance between two successive cuts of the stream is equal to the length of the arc of circle between two successive elements 7 which are provided on roll 6.

With reference now to FIGS. 2 to 5 included for better illustration, a detailed example of realization of the same apparatus is described, fit for cutting exactly in predetermined lengths and under ideal conditions at zero relative speed between the clay stream and the cutting machine, which was briefly and schematically discussed above with reference to FIG. 1.

In FIG. 2, 10 is a clay stream extruded through die 11 belonging to a conventional brick moulding machine standing on floor 12 and not represented for the sake of simplicity.

Strand 10 moves continuously but with a variable speed depending on the quantity of clay entering the machine in the unit of time, on the water percentage contained in the clay, on the time passed from the moment of the machine start up and on many other factors which influence the instant speed of the stream.

14 is the frame of a carriage moving on wheels 15 which are mounted revolving around bearings 16 rigidly connected to frame 14. These wheels 15 move along rails 17, which are fastened to base 18.

Base 18 is placed on floor 12. On the carriage a plurality of rolls 19 are mounted on which lies stream 10. The direction of rails 17 is parallel to the direction of the movement of stream 10 in a way such that the carriage can move parallel to the direction of movement of stream 10.

As a consequence, if for a certain period of time and moment by moment the speed of the carriage is equal to the speed of stream 10 the relative position between stream 10 and the carriage keeps stationary for the above period of time.

A roll 20 is keyed rigidly on a shaft 21. Shaft 21 can rotate freely in bearings connected to frame 14 of the carriage.

The axis of shaft 21 is perpendicular to the direction of movement of stream 10. Stream 10 keeps continuously in contact with the outer surface of roll 20 in such a way that no slip between the outer surface of roll 20 and the surface of stream 10 in contact with said roll takes place.

At one end of shaft 21 a gear 23 is rigidly keyed which drives a gear 24 by means of a chain 25. Chain 25 is kept constantly under tension by means of a chain stretcher 26 on which a spring 27 operates which has one end connected to frame 14 of the carriage and the other end connected to chain stretcher 26.

Gears 23 and 24 are detachable and replaceable with others having different gear ratios.

Gear 24 is rigidly keyed on a shaft 28 parallel to shaft 21. Shaft 28 is mounted by means of bearings on frame 14 of the carriage.

A strut 29 is rigidly and integrally mounted on shaft 28. On the same shaft 28 lever 30 is freely mounted which can rotate around shaft 28 itself. To this lever one end of a spring 31 is connected the other end of which is connected to a hook 32 rigidly connected to strut 29.

Spring 31 forces lever 30 to adhere to a catch 33 rigidly connected to strut 29, unless such an effort is made against lever 30 as to drive it away from catch 33 against the action of spring 31.

The free end of lever 30 is fit for engaging the free end a lever 44 hereafter described.

Since the tension of spring 27 is such that a loosening of chain 25 never occurs, it must be noticed that once gears 23 and 24 are keyed on and until lever 30 adheres to catch 33, a two way relationship is established between the movements of stream 10 relative to frame 14 of the carriage and the rotations of lever 30 around the geometrical axis of shaft 28. As will later on become apparent from the present description, to the 360° angle rotated by lever 30 around the axis of shaft 28 a peripheral development of roll 20 and therefore a development of stream 10 corresponds equal to the cutting length of the cutting machine. By changing the gear ratio of gears 23 and 24 of the peripheral development of roll 20 corresponding to the lever angle of 360° changes and therefore the length of cutting also changes.

From FIG. 2 it can be seen that on frame 14 of the carriage an electromagnet 35 is mounted which is usually deenergized and which become energized when a normally opened contact 36 close. Electromagnet 35, when energized, attracts downward a rod 37 which otherwise is kept up by means of a spring 38 one end of which is connected to a strut 39, which is rigidly connected to frame 14 of the carriage, and the other is connected to a projection 40 rigidly connected to rod 37.

Rod 37 is connected at its upper end with a slide 41 which supports a shaft 42 in a freely rotating way. Slide 41 slides in and is guided by guides 43 which are rigidly connected to frame 14 and which allow slide 41 only an upward or downward movement in connection with the action of spring 38 and of electromagnet 35.

To shaft 42, rotating inside slide 41, lever 44 is rigidly connected which presses the end of a small piston 46 when lever 44 itself is forced against a valve 47 shown in detail in FIG. 3 and which will be described further on.

Shaft 42 of lever 44 cannot rotate more than a certain amount inside slide 41 because the movement of lever 44 is limited on one side by valve 47 and on the other side by a catch 48 rigidly connected to frame 14 of the carriage.

The upper end of lever 44, if magnet 35 is deenergized and therefore lever 44 is in the upper position, is placed in the way of the free end of lever 30 when the latter rotates around the axis of shaft 28. Vice-versa, if magnet 35 is energized, lever 44 moves downward allowing lever 30 to pass. It must be noticed that the ratio between the actions exerted by spring 50 (see FIG. 3) on piston 46 in valve 47 and by spring 31 on lever 30 is such that, when lever 30 presses against lever 44 and the latter in its turn presses against the end 45 of piston 46, spring 50 will allow piston 46 to move along its axis until surface 51 of piston 83 will engage the opposed surface of piston 46, long before spring 31 will allow lever 30 to leave catch 33.

Again with reference to FIG. 2, 53 is a cylinder having an axis parallel to the direction of rails 17 and to the movement of stream 10, connected by means of a support 54 to base 18.

It must be noticed that, if on assembling the apparatus which is being illustrated, the perfect parallelism of cylinder 53 axis to the movement of the carriage along rails 17 could not be secured, cylinder 53 should be connected to base 18 by means of a ball joint which allows the axis of the cylinder small rotation around the center of the joint itself.

Inside the cylinder a piston 55 can move the opposed ends of which define with cylinder 53 two cavities 58 and 59 having a volume variable with the position of piston 55 in the cylinder.

To piston 55 on one side of its face one end of a hollow stem 62 is fastened which, near its other end, is secured to frame 14 of the carriage by means of a pair of nuts 63. Stem 62 is hollow and it is connected, at the end near the pair of nuts 63, to a piping 64 which is connected to valve 47, the said stem being provided, near piston 55, with an orifice connecting the inner cavity of stem 62 with cavity 58.

Orifice 65 is positioned in such a way so as to be never even partially closed, even when piston 55 is completely moved to the right side of FIG. 2, because catches 60 are provided on the two ends of the cylinder. This way the passage from pipe 64 to cavity 58 is permanently secured. Likewise, onto the second side of piston 55 face, an end of a stem 66 is secured which, near its other end, is also secured to frame 14 of the carriage by means of a pair of nuts 63.

Stem 66 is hollow and is connected, at its end near the pair of nuts, to pipe 68, which is also connected to valve 47, the stem being provided, near the piston, with an orifice 69 which connects the inner cavity of stem 66 with cavity 59. Orifice 69 is positioned in such a way so as to be never even partially closed, even when piston 55 stops against catch 60 at the left side of FIG. 2 so that the passage between pipe 68 and cavity 59 is permanently secured.

It must be noticed that, if on building the apparatus which is being illustrated, the perfect parallelism of cylinder 53 axis to the movement of the carriage along rails 17 could not be secured, only one of the stems 62 and 66 should be connected to frame 14 of the carriage it being possible to realize this connection by means of a ball joint instead of the pair of nuts 63.

The discharge pipes 70 and 71 of valve 47 (FIGS. 2 and 3) join in one pipe 72 (FIG. 2) which, by means of a flexible pipe 73, is connected to a pipe 74 which conveys the oil back to a reservoir 75. From reservoir 75 a pipe 76 feeds the oil to a gear pump 77, which, in its turn, feeds the oil into a pipe 78 which is connected by means of a flexible pipe 79 to pipe 80 connected to valve 47.

The pressure of the fed oil is controlled by means of a discharge valve 81.

FIGURE 3 shows valve 47 of a type having four pilot edges provided with a servomotor piston. Valve 47 comprises an external body having a cylindrical cavity inside which a main piston 83 moves with a rectilinear motion, having itself an inner cylindrical cavity inside which the servomotor piston 46 moves.

The end 45 of piston 46 projects from valve 47. "Front side" of valve 47 is called the side from which part 45 of piston 46 projects, the opposite side being called "rear side." 84 is the passage inside body 82 through which a pressurized fluid, for example oil, comes from pipe 80 to enter a cavity 85 placed between piston 83 and the body 82. 86 is a passage inside piston 83 through which the pressurized oil goes from cavity 85 to a cavity 87 placed between piston 46 and piston 83. 88 is a passage inside body 82 connecting pipe 68 with a cavity 89 placed between body 82 and piston 83. 90 is a passage inside body 82 connecting pipe 64 with a cavity 91 placed between body 82 and piston 83. 92 is a passageway inside body 82 through which oil goes from cavity 93 placed between piston 83 and body 82 into the discharge pipe 70. 94 is a passage inside body 82 through which oil passes from a cavity 95 placed between piston 83 and the body 82, to go into the discharge pipe 71. 96 is a passage inside piston 83, through which oil passes from a cavity 97, placed between piston 46 and piston 83, to go into cavity 93. 98 is a passage inside piston 83 through which oil passes from a cavity 99, placed between piston 46 and piston 83, into cavity 95. 100 is a passage inside the piston 83 connecting a cavity 101 placed between body 82 and piston 83 with a cavity 102 placed between piston 83 and piston 46. 103 is a passage inside piston 83 connecting cavity 104 placed between body 82 and piston 83 with a cavity 105 placed between piston 83 and piston 46.

The movement of piston 83 along its axis and towards the front side of valve 47, is limited by surface 106 of body 82 which engages the opposed surface of piston 83.

The movement of piston 83 along its axis and towards the rear side of valve 47 is limited by surface 108 of body 82 which engages the opposed surface of piston 83.

In the same way also the movement of piston 46 along its axis it limited by surfaces 110 and 51 of piston 83 which engage respectively the opposed surfaces of piston 46 when the latter moves, with respect to piston 83, towards the front side of valve 47 or towards the opposite side, respectively.

50 is the spring which by abutting surface 112 of piston 83 and the opposing surface of piston 46 causes the said piston to be completely forward with respect to piston 83 unless an action opposed to the action of said spring, acting against end 45, compels piston 46 to move with respect to piston 83 towards the rear side of the valve.

When lever 30 does not press against lever 44 spring 50 of the valve compels piston 46 to move forward with respect to piston 83 until the piston 46 engages surface 110 of piston 83. In this case the following happens: pipe 80, carrying the oil under pressure, communicates, through passage 84, with cavity 85, and, through passage 86, with cavity 87. Because of the movement of piston 46, cavity 87 is in communication with cavity 102, which, in its turn, is in communication with cavity 101 through passage 100. Therefore pipe 80 is connected to caivty 101. At the same time cavity 104 is connected through passage 103 with cavity 105, which, because of the movement of piston 46, is connected to cavity 97. On the other hand, cavity 97 is in communication, through passage 96, with cavity 93, which, in its turn, is in communication with the discharge pipe 70, through passage 92.

In the end, cavity 104 is connected to the discharge pipe 70. The fact that cavity 101 is connected to the feed pipe 80 and that cavity 104 is connected to the discharge, causes piston 83 to move along its axis towards the front side of valve 47, until it meets surface 106. This forward movement of piston 83 with respect to body 82 puts cavity 91 in communication with cavity 85 and cavity 89 in communication with cavity 93, that is cavity 58 of cylinder 53 in communication with feed pipe 80 and cavity 59 of cylinder 53 in communication with the discharge pipe 70. Therefore, when lever 30 (FIG. 2) does not press against lever 44 the end 45 of piston 46 is forced to move completely forward with respect to piston 83 (FIGURE 3) in such a way so as to engage surface 110 of piston 83 which is forced to move completely forward with respect to valve body 82 until it abuts against surface 106.

Once piston 83 is moved completely forward, the communication ports of the oil between cavities 85 and 91 and cavities 93 and 89 are at their biggest so that the communication ports between the feed pipe 80 and cavity 58 and between cavity 59 and discharge pipe 70 are also at their biggest.

When lever 30 presses against lever 44 strongly enough, notwithstanding the action of spring 50, to force piston 46 to move along its axis (see FIG. 3) until surface 51 of piston 83 engages the opposed surface of piston 46, cavity 87 is put in communication with cavity 105 and cavity 99 is put in communication with cavity 102.

As a consequence, cavity 104 is put in communication with feed pipe 80 and cavity 101 is put in communication with the discharge pipe 71. As a consequence piston 83 is forced to move backward, along its axis, until it becomes engaged against surface 108 of body 82, provided lever 30 keeps maintaining, through lever 44 and notwithstanding the backward movement of piston 46 along its axis, said piston 46 in such a position with respect to piston 83 that a communication exists between cavities 87 and 105 and cavities 99 and 102.

Once piston 83 is moved completely backward, the communication ports for the oil between cavities 85 and 89 and between cavities 95 and 91 are at their biggest so that the communication ports between feed pipe 80 and cavity 59 of cylinder 53 and between cavity 58 and discharge pipe 71 are at their biggest.

Piston 46 can take all the intermediate positions, with respect to frame 14 of the carriage, between the extreme forward position in which it is lying against surface 110 of piston 83 and this is lying against surface 106 of body 82, and the extreme backward one in which the piston is in touch with surfaces 51 of piston 83 and the latter in turn is in touch with surface 108 of body 82.

To the intermediate positions of piston 46 communication ports between cavities 58 and 59 and pipes 80, 70, 71 generally correspond which are intermediate between the two extremes considered above.

The valve is the mechanism which controls the oil inlet into cavities 58 and 59 of cylinder 53, depending on the position in which piston 46 is forced.

Now, with reference particularly to FIGS. 2 and 5, 113, is an electromagnet rigidly connected to frame 14 of the carriage above stream 10, the walls of which are thin and define three continuous longitudinal holes; 114 is another electromagnet rigidly connected to frame 14 but below strand 10. 115 is a rectangular framework subject to the action of electromagnets 113 and 114 and moving upward when electromagnet 113 is energized and electromagnet 114 is deenergized and downward when electromagnet 114 is energized and electromagnet 113 is deenergized.

Stream 10 passes through framework 115 and to the latter thread 116 is connected which cuts stream 10. The position of thread 116 inside framework 115 and of electromagnets 113 and 114 is such that, if there is no movement of the carriage relative to stream 10 a cut is operated at right angle with the direction of movement of strand 10.

Electromagnet 113 is normally energized and becomes deenergized when normally closed contact 117 opens. Electromagnet 114 is normally deenergized and becomes energized when normally opened contact 118 closes.

Reference is now made particularly to FIG. 4. Contacts 117 and 118 are actuated at the same time by rod 119 of switch 120 rigidly mounted on frame 14 of the carriage. 121 is a support, rigidly connected to switch box 120, on which lever 122 is hinged, which presses rod 119 in its clockwise rotation. Lever 122 is normally forced, by means of a spring not shown for the sake of simplicity, to rotate counterclockwise and is limited in this rotation by a catch 123 secured to support 121.

On lever 122 a lever 124 is hinged which is normally forced, by a spring not shown for the sake of simplicity, to rotate clockwise (FIG. 4), with respect to lever 122 and is limited in this rotation by a catch 125 secured to lever 122.

Lever 124 supports in a freely rotating way a small wheel 126 which contacts projection 127, secured to base 18, when the carriage moves along rails 17.

When wheel 126 does not touch projection 127, lever 124 interferes with catch 125, lever 122 interferes with catch 123, rod 119 is not pressed, contact 117 (FIG. 5) is closed, contact 118 is opened, electromagnet 113 is energized, electromagnet 114 is deenergized, therefore framework 115 and thread 116 are pushed upward.

When the carriage moves along rails 17 away from die 11 and at the same time wheel 126 changes from the idle position to a position of interference with projection 127, lever 124 interferes with catch 125, the lever 122 rotates clockwise and presses against rod 119, contact 117 opens, contact 118 closes, electromagnet 113 becomes deenergized, electromagnet 114 becomes energized, therefore framework 115 and thread 116 are pushed downward.

When the carriage moves along rails 17 approaching die 11 and at the same time the small wheel 126 from the idle position gets into a position of contact with projection 127, lever 124 rotates counterclockwise (FIG. 4), leaving catch 125, lever 122 does not move and interferes with catch 123, rod 119 is not pressed, electromagnet 113 is energized, electromagnet 114 is deenergized so that framework 115 and thread 116 stay up.

On frame 14 of the carriage is mounted a conventional limit stop 128 (FIG. 2) which, when in contact with a projection 129 rigidly connected with base 18 through support 54, keeps contact 36 closed, relevant to electromagnet 35 (FIG. 2). When, vice-versa, limit stop 128 is not in contact with projection 129 electromagnet 35 is deenergized.

The operation of the described apparatus will now be described with reference to FIGS. 2 to 5, from the position when carriage is completely moved towards die 11, that is when piston 55 is completely moved to the left inside cylinder 53; in this position the small wheel 126 is not in contact with projection 127 and therefore electromagnet 113 is energized, electromagnet 114 is deenergized and thread 116 is placed above stream 10 moving out of die 11.

Also limit stop 128 is not in contact with projection 129, therefore electromagnet 35 is deenergized, rod 37 is kept up by the action of spring 38 and in its turn keeps up lever 44 the end of which is placed in the way of the end of lever 30 in its rotation around shaft 28.

Stream 10 in its advancing movement drives roll 20 without any slippage of the outer surface of roll 20 relative to stream 10. Roll 20 in its turn turns support 29 which through the action of spring 31 turns lever 30 which keeps adhering to catch 33.

At the same time piston 46 is completely moved forward with respect to valve 47 and the communication ports between feed pipe 80 and cavity 58 of cylinder 53 and between discharge pipe 70 and cavity 59 of the said cylinder are at their maximum opening.

As a consequence of the advancing movement of stream 10 with respect to the carriage, the free end of lever 30, rotating clockwise (FIG. 2) around the axis of shaft 28, comes into contact with the free end of lever 44 which, overcoming the action of spring 50, moves piston 46 towards the rear side of valve 47.

The movement to the rear of piston 46 starts the controlling action of valve 47 on the oil flow into cylinder 53. In this initial phase of the control of oil flow into cylinder 53 the importance of the fact that roll 20 can rotate on clockwise must be noticed (FIG. 2) even if lever 30 is not allowed to rotate around the axis of shaft 28 by lever 44 which is in turn restricted from moving towards valve 47 by piston 46 which is completely moved towards the rear side of said valve 47.

Indeed, if such were not the case, that is, if lever 30 were rigidly connected to catch 33, at high speeds of stream 10 pump 77 would not be able to impart to piston 55 and therefore to the carriage itself the same speed as stream 10 suppressing in such way the rotation of roll 20 around its axis, and, therefore, suppressing the rotation of lever 30 around the axis of shaft 28 before piston 46 is completely moved towards the rear side of valve 47. Under these circumstances, since roll 20 would not be able to rotate around its axis and since stream 10 would still have a forward speed with respect to the carriage, said stream 10, pushed by the brickmoulding machine, would either slide on the outer surface of roll 20, in which case an inadmissible error in the measure of the cut would result, or buckle between the roll and die 11 because of the resistance which would be developed in sliding on roll 20 itself.

However, since lever 30 is not rigidly connected to catch 33 but elastically through spring 31, the result is that roll 20 can still rotate clockwise (FIG. 2) that is catch 33 can leave lever 30, for a certain time after piston 46 is completely moved towards the rear side of valve 47, in which position the communication ports between the feed pipe 80 and cavity 59 and between cavity 58 and discharge pipe 71 are at their biggest; during the above period of time roll 20 having to overcome a not too big resistance deriving mainly from the traction stress of spring 31, in order to rotate around its axis, all this while the carriage is allowed to reach the same speed as stream 10.

After the moment when the carriage has reached the same speed as stream 10 and when, as a consequence, roll 20 has no rotation movement around its axis, the communications ports between pipe 80 and cavity 59 and between cavity 58 and discharge pipe 71 still being at their largest, the carriage continues accelerating moving with a speed higher than the one of stream 10 so that roll 20 starts rotating counterclockwise (FIG. 2) and catch 33 approaches lever 30.

When catch 33 reaches lever 30, the latter also starts to rotate counterclockwise (FIG. 2) and piston 46, being pushed by spring 50, starts moving towards the front side of valve 47. Now, if the carriage overtakes stream 10 so that lever 30 rotating counterclockwise (FIG. 2) allows piston 46, and therefore piston 83, to move towards the forward end of valve 47, the cross sections for the oil flow decrease between pipe 80 and cavity 59 and between cavity 58 and pipe 71 and the cross sections between pipe 80 and cavity 58 and between cavity 59 and pipe 70 increase, so that the carriage is forced to slow down.

Vice-versa, when the carriage is slower than stream 10, so that lever 30 rotating clockwise (FIG. 2) forces piston 46 and therefore piston 83 towards the rear side of valve 47, as a consequence of the opposite way of varying of the cross sections for the oil flow between the feed and discharge pipes and cavities 58 and 59, the carriage is forced to accelerate.

Thus, after a short period of time, the carriage assumes the speed of stream 10 keeping lever 30 in contact both with catch 33 and with lever 44 which is in turn in contact with piston 46 which thus is located, with respect to valve 47, near the equilibrium point, which point is determined by many factors, one of them being the advancing speed of stream 10.

From this moment on piston 46 is left practically idle with respect to valve 47 for the period of time in which, a described hereafter, stream 10 is being cut.

While this is happening, the small wheel 126 is engaged by projection 127 and therefore magnet 114 is energized and magnet 113 is deenergized. As a consequence framework 115 moves downward and thread 116 cuts the strand.

Continuing the advancing movement of carriage together with stream 10, the small wheel 126 leaves profile 127 and therefore magnet 113 is energized and magnet 114 is deenergized. As a consequence framework 115 moves upward and thread 116 passes again through the cut made in its downward movement.

Continuing the advancing movement of carriage together with stream 10, the limit stop 128 is engaged by profile 129 and as a consequence magnet 35 is energized and levers 37 and 44 move downward so that the upper end of lever 44 leaves contact with lever 30. As a consequence spring 50 moves piston 46 towards the front side of valve 47 and, as already seen, piston 83 is forced forward, making biggest the communication ports between feed pipe 80 and cavity 58 and between discharge pipe 70 and cavity 59, when it engages against surface 106 of the valve body 82.

While the piston 83 moves forward with respect to valve 47, the carriage slows down with respect to stream 10 and reverses the direction of its movement going back along rails 17 towards die 11. Slowing down the carriage with respect to stream 10, lever 30 starts again rotating clockwise (FIG. 2), overtaking thus the position occupied by lever 44 when the latter is up. In the returning movement of the carriage the limit stop 128 disengages from projection 129 and as a consequence magnet 35 deenergizes and levers 37 and 44 move upward.

During the return movement of the carriage the small wheel 126 of switch 120 is engaged by projection 127, but rod 119 of the said limit stop is not pressed.

During further return movement, the small wheel 126 leaves profile 127 and switch 120 sets in an idle position. Finally carriage gets to the initial position where piston 55 is completely moved to the left side of cylinder 53 and engages with limit stop 60 of the cylinder, after having been slowed down by a dampener not shown in the drawings. The carriage stays in this position until, as seen, lever 30 engages with lever 44, starting a new controlling action of valve 47 on the oil flux to cylinder 53.

After the initial period of this new control action, the carriage, as seen above, reaches the speed of stream 10 while lever 30 keeps in contact both with catch 33 and with lever 44, which is in its turn in contact with piston 46 which is positioned near the equilibrium point which depends, among other things, on the speed of stream 10.

One sees therefore that lever 30 has made a rotation of 360° with respect to the position in which the previous cut has been performed, except for the error due to the differences in the positions of piston 46 during two successive cuts; on the other hand, since these differences in position are very small the consequent error in the measurement of the cut is negligible and much smaller than the one of other apparatus realized according to the known art.

One can see, moreover, that the preselected length of cut is the length of stream which, passing without sliding on roll 20, causes lever 30 to rotate through 360° and that the preselected length of cut can be changed changing the ratio of gears 23 and 24.

As has already been said, the apparatus previously described apparatus has been illustrated as an example, but it must be understood that the apparatus itself can take different shapes, all in the scope of the invention, as can be different the continuously moving materials as well as the operations which can be performed on the said materials.

To be clearly understood, again referring to the described example in which a cutting machine performs on the clay streams cuts having all the same distance from one another, it has already been said that, in order to change the length of cut it is enough to change the gear ratio between roll 20 and shaft 28, that is between gears 23 and 24. It must be noticed now that, if the above gear ratio is changed, by means, for example, of a conventional gear box placed in place of gears 23 and 24, during the apparatus operation and in the period of time in which the cut is performed, that is in which roll 20, practically still with respect to the clay stream, has already measured the length of the previous cut but has not started yet the measurement of the next cut, the preselected distance between a point in which an operation is performed and the next point, that is between a cut and the next one, is changed, in a preselected manner.

It is also possible, in a way which is not described here, since it is completely obvious to an expert of the art, to control the changes of the above gear ratios between gears 23 and 24 in the time interval in which the cut is performed by means of a programmer, e.g. of the electronic type with punched cards, so that the operations can be performed on the continuously moving material in preselected places according to a prefixed program.

It is also evident that in place of the cutting machine which cuts the clay stream different mechanisms or more mechanisms can be provided which perform equal or different operations either at the same time or in fixed and constant or variable succession the one after the other. For example, in place of cutting machine a drilling and a punching machines can be provided which work at the same time or in succession on the continuously moving material. Again as has already been mentioned with respect to the gear ratio variation between gears 23 and 24, it is possible to insert a programmer not illustrated for the sake of simplicity since its construction and connection are obvious to an expert of the art, which controls according to a preset program the succession of the operations performed by the mechanism or mechanisms carried by the carriage. Thus, for example, in one of said operations only the drill can be ordered to drill a hole, in the operation coming right next the operation only of the punching machine can be ordered, in the next operation again in the simultaneous operation of the drilling and punching machines and so forth.

Keeping now in mind that the continuously moving material can be of extremely varied type, such as, for example a, metal pipe, a continuous ribbon of fabric or paper, a metal sheet or a succession of elements equal or different to one another, but always continuously moving, one can understand that the characteristics of the present invention allow to perform with great accuracy in the desired places most different operations. For example, on a continuous ribbon of fabric, images in a certain colour can be printed, images which can be then partially over printed, in a very accurate way, with different colours, giving as final product a fabric ribbon with polychrome images printed in a perfect way. As a further example one can think of a metal bar through which holes can be drilled and punched at preselected distances, the said bar being afterwards cut at an exactly preset length.

In case the operations which one wishes to perform are performed on a very tough or hard mtaerial, so that there might be a danger that while the operations are being performed the material does not stay still under the working mechanism, the material can be locked to the carriage in any way, not described here for the sake of brevity.

At the end of this description we wish to restate that, although a preferred embodiment of the present invention has been described in connection with the figures of the appended drawings, it must be obvious that other embodiments could be adopted.

I claim:

1. Apparatus for performing a series of successive operations at preselected places of material moving continuously in one direction comprising, in combination, support means; a carriage carried by said support means movable from a starting position in said one direction to an advanced position and in an opposite direction back to said starting position; operating means mounted on said carriage movable in a direction transverse to said one direction for performing said operations; drive means connected to said carriage for moving the same in said one and said opposite direction; a roll carried by said carriage for rotation about an axis substantially normal to said one direction and engaging the material to be rotated thereby; rotatable means turnably carried by said carriage and connected to said roll to be rotated thereby in a first direction when said carriage moves in said one direction slower than said material and in an opposite second direction when said carriages moves in said one direction faster than said material; control means including a movable member having an end portion located in the path of said rotatable means to be engaged and moved by the latter, said control means constructed and operatively connected to said drive means so as to control the latter to accelerate movement of said carriage in said one direction when said rotatable means is rotated in said first direction and to decelerate movement of said carriage when said rotatable means is rotated in said second direction until no relative movement between said carriage and said material takes place; second drive means connected to said operating means for moving the same in said transverse direction; actuating means connected to said second drive means for actuating the latter while said carriage moves at the same speed as the material and after said carriage is moved in said one direction a predetermined distance away from said starting position; and reversing means cooperating with said control means to cause reversal of said movement of said carriage after said operating means has performed one operation.

2. An apparatus as defined in claim 1, wherein said driven means comprises a fluid actuated motor and wherein said control means further includes valve means cooperating with said movable member of said control means for regulating flow of fluid into and out from said fluid actuated motor.

3. An apparatus as defined in claim 2, wherein said fluid actuated motor comprises a cylinder member having an axis substantially parallel to said direction of movement of said material and a piston member slidably received in said cylinder member, one of said members being connected to said support means and the other to said carriage, and including passage means controlled by said valve means for feeding fluid alternatingly into said cylinder to opposite sides of said piston and for discharging the fluid therefrom.

4. An apparatus as defined in claim 2, wherein said cylinder member is fixedly connected to said support means, and including a piston rod fixed to said piston member and projecting with opposite ends beyond said cylinder member, said opposite ends of said piston rod being fixed to said carriage.

5. An apparatus as defined in claim 2, wherein said valve means includes a valve housing and at least one valve member movable between a rest position in which an operating portion thereof projects a preselected distance beyond said housing and an extreme operating position, and resilient means engaging said valve member and being biased to resiliently maintain the latter in said rest position, said valve member in said rest position preventing flow of fluid into said cylinder member to one side of said piston member while allowing discharge of fluid from said one side and flow of fluid into said cylinder member to the other side of said piston member, said movable member being tiltably mounted on said carriage so as to be pressed when engaged by said rotatable means during turning of the latter in said first direction against said operating portion of said valve member to move the latter from said rest toward said operating position causing thereby increased flow of fluid into said cylinder member to said one side and discharge from said other side of said piston member.

6. An apparatus as defined in claim 5, wherein said rotatable means includes a first component connected to said roll to be rotated thereby, a second component adapted to engage said end portion of said movable member, and spring means connecting said second component to said first component for movement therewith while permitting yielding of said second component relative to said first component during rotation of the latter in said first direction when said second component has moved said one valve member to said extreme operating position.

7. An apparatus as defined in claim 6, wherein said first component comprises a second roll turnably about a second axis and having a stop projecting from a side face thereof, and wherein said second component comprises a lever turnably about said second axis and having a free end adapted to engage said end portion of said movable member, said spring means being connected to said second roll and said lever and being biased for yieldably holding said lever against said stop.

8. An apparatus as defined in claim 6, wherein said valve means includes further a second valve member arranged in said housing movable between a pair of opposite end positions, said second valve member cooperating with said one valve member to be moved to one of said end positions when the latter is moved by said movable member from said rest to said operating position against the force of said resilient means causing thereby increased flow of fluid to one side of said piston, said second valve member cooperating with said one valve member for reversing flow of fluid into said cylinder when said one valve member is permitted by said movable member to move under the influence of said resilient means to said starting position.

9. An apparatus as defined in claim 8, wherein said movable member is mounted on said carriage also for movement between an active position in which said end portion thereof is located in the path of said lever and an inactive retracted position and including a spring connected to said movable member for resiliently maintaining the same in said active position, said reversing means including retracting means cooperating with said movable member for moving the latter from said active to said retracted position, and cooperating means on said carriage and said support means for actuating said retracting means.

References Cited by the Examiner
UNITED STATES PATENTS

| | | | |
|---|---|---|---|
| 587,363 | 8/1897 | Edwards | 91—435 X |
| 2,641,042 | 6/1953 | Kopp | 25—107 |
| 3,251,255 | 5/1966 | Bauman | 83—295 |

ANDREW R. JUHASZ, *Primary Examiner.*